United States Patent [19]

Carter

[11] 4,231,825
[45] Nov. 4, 1980

[54] METHOD OF MAKING JACKETED FOAM PIPE INSULATION

[75] Inventor: Neil A. Carter, Reynoldsburg, Ohio

[73] Assignee: Owens-Corning Fiberglas Corporation, Toledo, Ohio

[21] Appl. No.: 32,182

[22] Filed: Apr. 23, 1979

[51] Int. Cl.² ............................................. B32B 5/20
[52] U.S. Cl. ........................................ 156/78; 156/79; 156/242; 156/245; 264/45.1; 264/46.4; 264/259; 264/275; 264/321
[58] Field of Search .................. 156/78, 79, 242, 245; 264/45.1, 46.4, 250, 251, 255, 257, 259, 266, 275, 320, 321

[56] References Cited

U.S. PATENT DOCUMENTS

| 2,642,920 | 6/1953 | Simon et al. | 156/78 |
| 3,684,609 | 8/1972 | Schneider | 264/321 |

FOREIGN PATENT DOCUMENTS

| 2124364 | 11/1972 | Fed. Rep. of Germany | 264/46.4 |
| 993042 | 5/1965 | United Kingdom | 264/46.4 |

Primary Examiner—Caleb Weston
Attorney, Agent, or Firm—Ronald C. Hudgens; Philip R. Cloutier; Paul J. Rose

[57] ABSTRACT

The method includes forming a semicylindrical glass fiber reinforced jacket, assembling the jacket with a smaller semicylindrical mold to provide a semicylindrical space therebetween, inserting foamable hardenable liquid resin in the space, allowing the liquid resin to foam and harden, removing the mold, and adhering compressible fibrous glass wool to an end face and to one flat longitudinal face of the jacketed foam. Optionally, compressible fibrous glass wool may also be applied to the radially inner face of the jacketed foam.

2 Claims, 1 Drawing Figure

U.S. Patent  Nov. 4, 1980  4,231,825
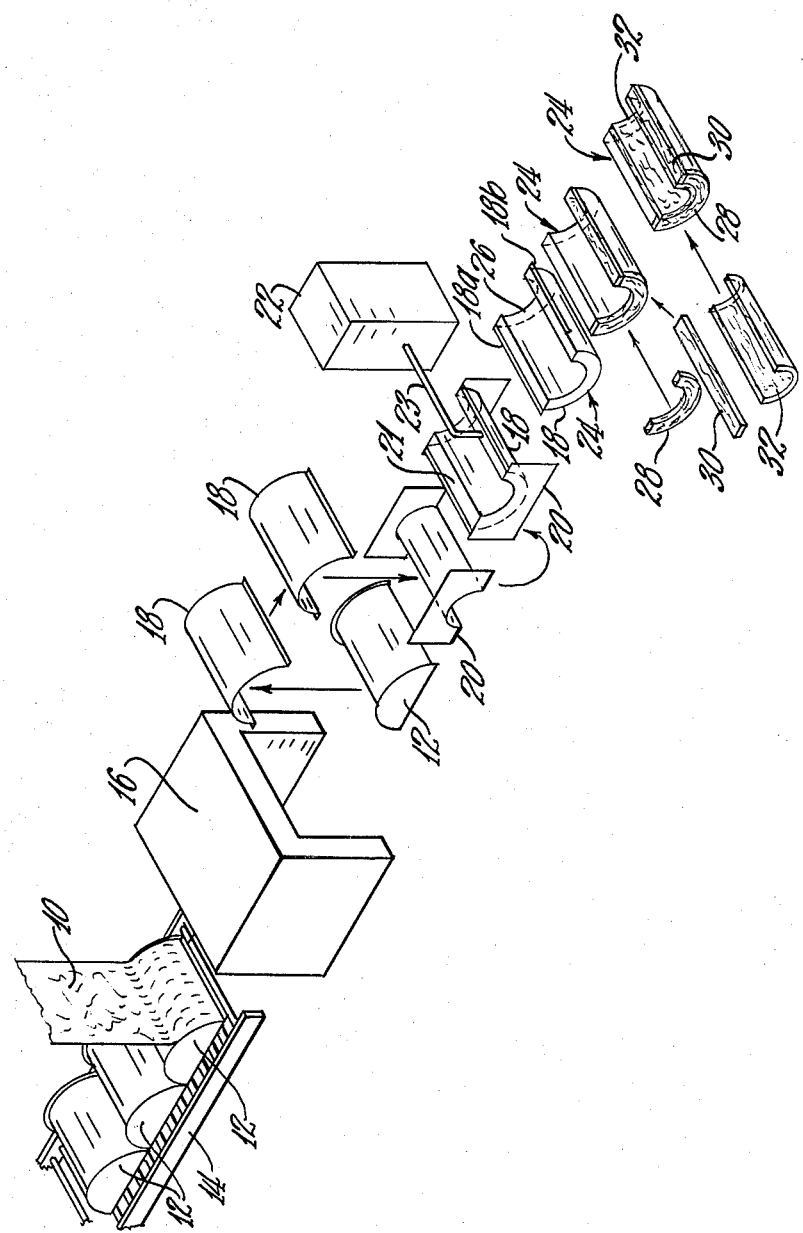

METHOD OF MAKING JACKETED FOAM PIPE INSULATION

This invention relates generally to a method of making pipe insulation, and more particularly to a method of making semicylindrical sections of pipe insulation each including rigid plastic foam having a protective outer jacket of glass fiber reinforced plastic and fibrous glass wool adhered to joint forming surfaces.

An object of the invention is to provide an improved method of making such pipe insulation.

Other objects and advantages will become apparent when the following specification is considered along with the accompanying perspective drawing schematically illustrating the improved method of making pipe insulation in accordance with the invention.

The drawing shows a schematic perspective view illustrating the method steps of the invention.

With reference to the drawing, a supply of resin impregnated fibrous glass mat 10 is shown being furnished to an outer surface of one of a plurality of successive semicylindrical molds 12 of a radius substantially equal to that of urethane foam in the finished product. The molds 12 are supported by a conveyor 14 only partially shown. The mat 10 is draped successively over the molds 12 and cut to a proper length for each mold. Thereafter the molds 12 with resin impregnated mat 10 thereon are fed through a small oven or hot box 16 to cure the resin in the mat and thereby produce semicylindrical glass fiber reinforced resin jackets 18. The jackets 18 are removed from the molds 12 and placed in cooperative concentric relationship respectively with semicylindrical molds 20 of a smaller radius than that of the molds 12, whereby a semicylindrical space 21 is provided between a jacket 18 and the respective mold 20. A foamable hardenable liquid resin such as urethane from a foam machine 22 is then inserted in the space 21 through a pipe 23, a cover for the semicylindrical space 21 being omitted for clarity. The foamable liquid expands, sets, and adheres to the jacket 18 to form a semicylindrical piece of jacketed foam pipe insulation 24 including the jacket 18 and hardened foam 26. The piece 24 is removed from the respective mold 20 and jacket flanges 18a and 18b, formed from an excess of resin impregnated mat 10 having been applied to the respective mold 12, are cut off. A semicircular compressible pad 28 of fibrous glass wool is then adhered with a suitable adhesive to one of the end faces of jacketed foam pipe insulation 24 and a compressible strip 30 of fibrous glass wool is adhered to one of a pair of flat longitudinal faces of the jacketed foam pipe insulation 24, whereby when a pipe is insulated with pieces 24, there will be a fibrous glass wool expansion-contraction joint at each prospective joint. Optionally, a compressible semicylindrical piece 32 of fibrous glass wool may be adhered to the radially inner side of the foam 26.

Various modifications may be made in the method shown and described without departing from the spirit and scope of the invention.

I claim:

1. A method of making jacketed foam pipe insulation (24) comprising applying hardenable liquid resin impregnated fibrous glass mat (10) to a semicylindrical mold (12), curing the resin in the mat (10) while it is on the mold (12) to form a semicylindrical glass fiber reinforced resin jacket (18), removing the jacket (18) from the mold (12), assembling the jacket (18) in cooperative concentric relationship with a second semicylindrical mold (20) of a smaller radius than that of the first mold (12) to provide a semicylindrical space (21) therebetween, inserting a foamable hardenable liquid resin in the semicylindrical space (21), allowing the liquid resin in the space (21) to expand into foam (26) and harden while adhering to the jacket (18) to form a semicylindrical piece of jacketed foam pipe insulation (24), removing the second semicylindrical mold (20) from the jacketed foam pipe insulation (24), adhering a compressible semicircular pad (28) of fibrous glass wool with a suitable adhesive to one end face of the jacketed foam pipe insulation (24), and adhering a compressible strip (30) of fibrous glass wool with a suitable adhesive to a flat longitudinal face of the jacketed foam pipe insulation (24).

2. A method as claimed in claim 1 including adhering a compressible semicylindrical piece (32) of fibrous glass wool with a suitable adhesive to the radially inner side of the foam (26).

* * * * *